May 11, 1937.  L. BEEMAN  2,079,650
HOT WATER SUPPLY REGULATOR
Filed April 14, 1934  2 Sheets-Sheet 1
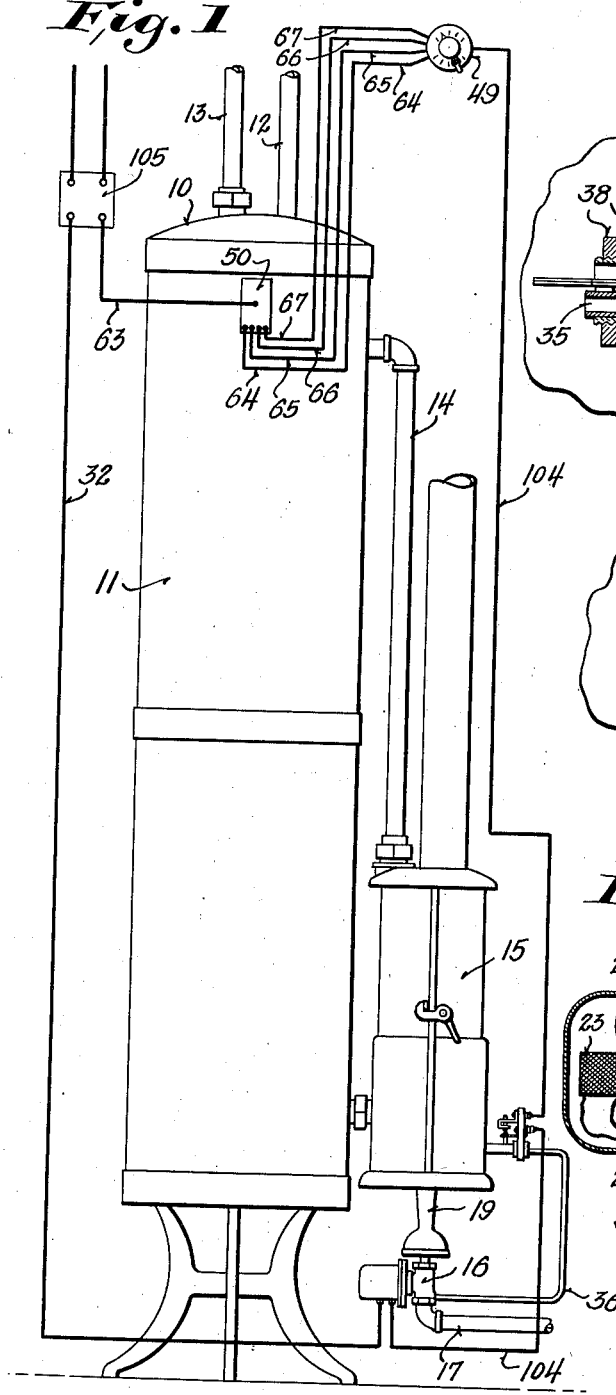
INVENTOR
Lyle Beeman
BY
ATTORNEY May 11, 1937.                L. BEEMAN                2,079,650
HOT WATER SUPPLY REGULATOR
Filed April 14, 1934            2 Sheets-Sheet 2
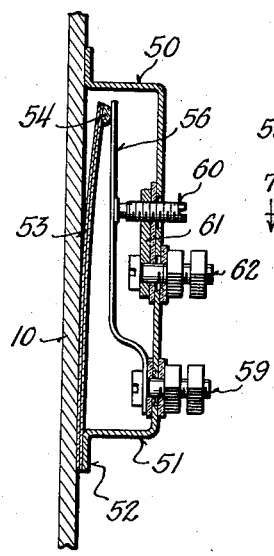
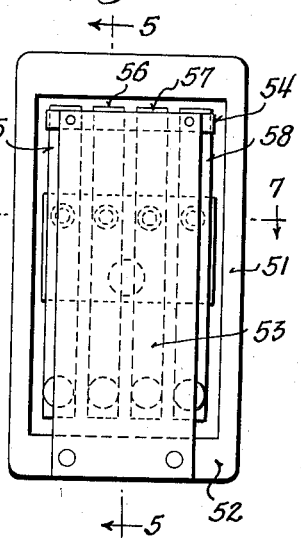
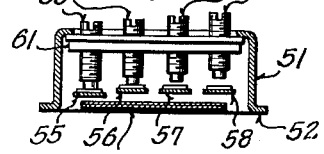
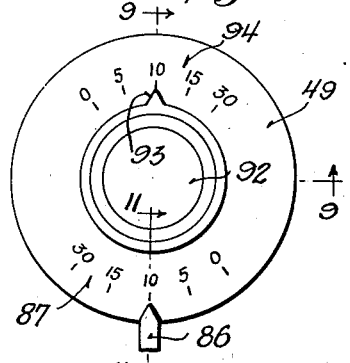
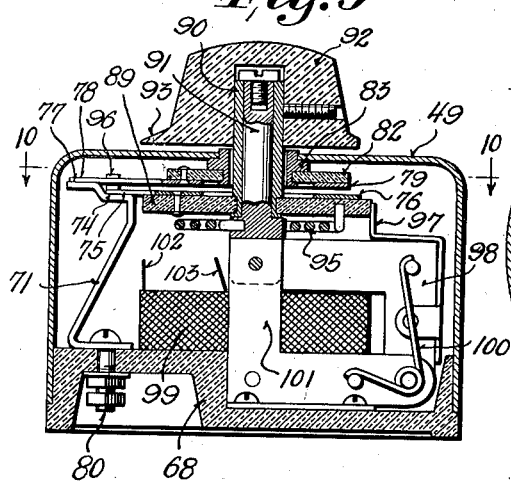
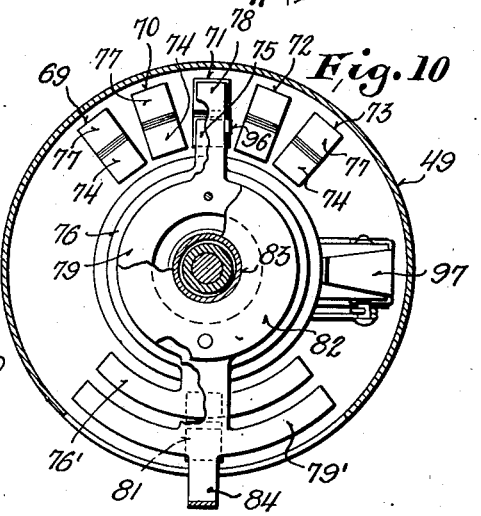
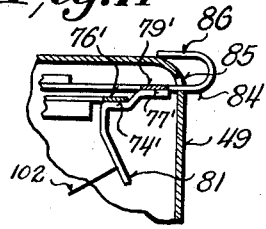
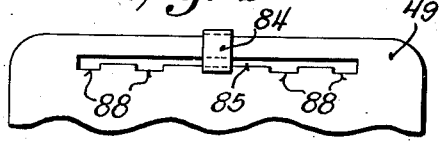
INVENTOR
Lyle Beeman
BY
Ralph W. Brown
ATTORNEY Patented May 11, 1937

2,079,650

UNITED STATES PATENT OFFICE 2,079,650

HOT WATER SUPPLY REGULATOR

Lyle Beeman, Milwaukee, Wis.

Application April 14, 1934, Serial No. 720,590

5 Claims. (Cl. 236—20)

This invention relates to regulators for domestic hot water supply tanks and particularly for those of the type wherein the hot water enters the top of the tank from an external heater.

One object of the present invention is to provide an improved electrical control system for hot water heaters automatically operable to maintain a predetermined supply of hot water in the top of the tank.

Another object is to provide an electrical control system of the character mentioned which may be readily adjusted to thereby regulate the amount of hot water automatically maintained.

Another object is to provide an electrical control system of the character mentioned which may be readily adjusted to provide a predetermined temporary increase in the supply of hot water, as occasion may demand, and which will thereafter function to automatically maintain a supply of hot water in an amount for which the system was initially set.

Another object is to provide a simple and improved remote controller for an electrical system of the character mentioned which may be located at any convenient point in a house or other building and readily manipulated to regulate and control the hot water supply.

Another object is to provide a dual controller for this purpose having two elements, one adjustable to regulate the amount of hot water permanently maintained in the tank, and the other adjustable without disturbing the first to provide a temporary increase in the hot water supply.

Another object is to simplify and improve each of the several elements which are included in a control system of this type.

Other objects and advantages will appear from the following description of an illustrative embodiment of the present invention.

In the accompanying drawings:—

Figure 1 is a diagrammatic illustration of an electrical control system constructed in accordance with the present invention and showing the same applied to a well known type of hot water supply tank and heater.

Fig. 2 is a sectional view of a pilot burner for the heater equipped with a temperature responsive switch.

Fig. 3 is an end elevation of the pilot burner on a somewhat larger scale.

Fig. 4 is a sectional view of an electromagnetic switch for controlling the supply of gas to the heater.

Figs. 5 and 6 are views in section and rear elevation, respectively, of a thermostatic unit which responds to the temperature of the water in the tank.

Fig. 7 is a sectional view on the line 7—7 of Fig. 6.

Fig. 8 is a view in front elevation of the controller.

Fig. 9 is a sectional view on the line 9—9 of Fig. 8 on a larger scale.

Fig. 10 is a sectional view on the line 10—10 of Fig. 9.

Fig. 11 is a sectional view on the line 11—11 of Fig. 8 on a larger scale.

Fig. 12 is a fragmentary view in side elevation of that portion of the controller shown in Fig. 11.

The control system selected for illustration is shown in Fig. 1 applied to a hot water storage tank 10 of standard commercial form which in this instance is enclosed in a jacket 11 of heat insulating material externally applied thereto. The tank is equipped with the usual cold water supply pipe 12, which projects into the bottom thereof, a discharge pipe 13, and a hot water supply pipe 14 leading to the top thereof from an external heater 15 of a well known gas burning type.

In this instance the supply of gas to the heater is controlled by an appropriate electromagnetic valve 16. The valve shown in Fig. 4 has been found to adequately serve the purpose. It comprises a hollow body connected at one end with the gas supply pipe 17 and provided at the other end with a discharge nozzle 18 which projects into a burner lead 19 in a well known manner.

A plunger 20, cooperating with a ported partition 21 in the valve body, controls the flow of gas therethrough, the plunger 20 being supported by a flexible diaphragm 22 and actuated and controlled by an electromagnet 23 through appropriate linkage.

In this instance the electromagnet 23 and linkage is contained within a housing comprising a supporting plate 24, removably fixed to the valve body 16, and a removable hood 25, removably fixed to the plate. The coil of the electromagnet is mounted on a laminated core 26 having a lateral supporting arm 27 fixed to the plate 24. An L-shaped laminated armature 28 is rockably supported at 29 on the arm 27 and connected to the valve plunger 20 through a link 30.

A spring 31 urges the armature 28 away from the core 26 and in a direction to advance the plunger 20 into valve closing position. The coil 23 is connected to one side 32 of an electrical control circuit through suitable binding posts 33 and 34, so that when the system and coil 23 is energized the plunger 20 is retracted to open the valve.

The heater 15 is automatically ignited by a pilot burner 35 which receives its supply of gas from the inlet side of the valve 16 through a tube 36. In this instance the pilot burner 35 enters the heater 15 through a tubular structure 37 having its inner end fixed in an opening in the wall of the heater by appropriate means such as a pair of clamp nuts 38 threaded on the tube.

A temperature responsive bi-metallic strip 39, mounted in the tube 37, extends over and beyond the end of the burner 35 so as to be directly heated by the pilot flame. The strip 39 is secured and supported intermediate its ends preferably by ears 40 struck inwardly from the tube 37. The outer end of the strip 39 carries a pin 41 of insulating material which actuates and controls the movable element 42 of a switch, carried by a plate 43 of insulating material fixed to the outer end of the tube 37 by clamp nuts 44. In the switch shown, the fixed contact member is in the form of a screw 45, adjustably fixed in a bracket 46 fixed to the plate 43. Screws 47 and 48, which support the movable element 42 and the bracket 46, constitute binding posts for the switch, the switch being through them connected in the control circuit in series with the electromagnetic valve 16.

The arrangement is such that so long as the strip 39 is heated by the pilot burner the switch element 42 is maintained in contact with the contact screw 45 to close the switch; but should the pilot burner become extinguished and the strip 39 become cool, the switch opens, thereby breaking the circuit and making it impossible to open the valve 16 by energizing its electromagnet. It is thus impossible to admit gas to the heater 15 unless the pilot flame is burning and ready to ignite the burner of the heater.

A controller unit 49 and a thermostatic unit 50 are also connected in the control circuit in series with the valve 16 and the pilot controlled switch 45, the controller 49 being disposed at any convenient point in the house, ordinarily remote from the storage tank 11, and the thermostat 50 being applied to the tank so as to respond to the temperature of the water therein.

The thermostatic unit shown in detail in Figs. 5, 6, and 7 is designed to respond to several predetermined temperatures. It includes a housing 51 having an open flanged base 52 for direct application to the tank 10. A relatively wide, temperature responsive, bimetallic strip 53 is fixed at one end to the base 52 and extends thereacross, and at its other end carries a transversely extended presser bar 54 of insulating material which bears against the ends of a plurality of resilient strips 55, 56, 57 and 58 constituting the movable contact members of separate switches contained in the housing.

In this instance four switches are shown having their movable contact members 55, 56, 57, and 58 independently supported at their other ends upon separate screws 59 fixed in but insulated from the housing 51 and forming binding posts for the switches. Each switch shown also includes a stationary contact member in the form of a screw 60, each arranged to contact the movable member at a point intermediate the ends of the latter. The several screws 60 are threaded in a conductor plate 61 secured within the housing 51 by a screw 62 which constitutes a common binding post for the several switches. The binding post 62, plate 61, and screw contacts 60 are insulated from the housing, the latter extending outwardly through the wall of the housing so as to be conveniently accessible for adjustment.

When the water in the tank 10 is cold, the bimetallic strip 53 is bent in such direction as to force the several switch members 55, 56, 57, and 58 into contact with their respective contacts 60, so that all the switches are then closed; and as the temperature of the water rises, the strip 53 tends to straighten out, thereby relieving the pressure between the bar 54 and the several members 55, 56, 57, and 58 and permitting the latter to withdraw from and break contact with their respective contacts 60. The several screws 60 are variously adjusted, so that the contact between them and their respective coacting members 55, 56, 57, and 58 is broken at different predetermined temperatures.

The several screw contacts 60 are electrically connected to the other side 63 of the electrical control circuit through the binding post 62 and plate 61; and the several switch members 55, 56, 57, and 58 are separately connected to the controller unit 49 through separate leads 64, 65, 66, and 67 and their respective binding posts 59.

The controller unit shown in detail in Figs. 8 to 12 comprises a housing 49 having a removable base 68 of insulating material. The base 68 supports an arcuate series of upright contact members 69, 70, 71, 72, and 73, each having a lower contact face 74 for coaction with the finger 75 of a rotary switch member 76 and an upper contact face 77 for coaction with the finger 78 of a rotary switch member 79. The several contact members 70, 71, 72, and 73 are provided with individual binding posts 80 connected respectively with the several leads 64, 65, 66, and 67.

A similar upright contact member 81, rising from the base 68, has similar lower and upper contact faces 74' and 77' which maintain contact with offset arcuate portions 76' and 79' of the switch members 76 and 79, respectively.

The two switch members 76 and 79 are independently rotatable. The upper member 79 is fixed to a disk 82 of insulating material carried by a central hollow bushing 83 journalled in a top opening in the housing 49. An arm 84 extending outwardly through a slot 85 in the housing provides a convenient means for manipulating the upper switch member 79. In this instance the end of the arm 84 is bent and fashioned to provide a pointer 86 which cooperates with a suitable scale 87 on the housing to guide one in setting the switch. Notches 88, formed in the slot 85, serve to retain the arm 84 in any of the five positions in which it may be set.

The lower switch member 76 is carried by a disk 89 of insulating material fixed to a sleeve 90 which extends upwardly through the bushing 83 and through the top of the housing 49. The sleeve 90 is rotatably supported on a stationary stem 91 and equipped with suitable manipulating means such as a knob 92 having a pointer 93 for cooperation with a second scale 94. Appropriate means, such as a spiral spring 95 anchored on the base of the stem 91, tends to rotate the switch member 76 counterclockwise (as viewed in Figs. 8 and 10) and a suitable stop in the form of a bent up ear 96 on the contact finger 75 coacts with the contact finger 78 on the upper switch member to limit such rotation of the lower switch member and to normally retain the fingers 75 and 78 in the superposed relation shown in Fig. 10.

Provision is also made for yieldably and releasably retaining the lower switch member 76 in any position into which it may be set. In this instance an electromagnetic brake is provided for the purpose. It comprises a clip 97 carried by the rocker element 98 of an electromagnet and arranged to engage the periphery of the disk 89 when the coil 99 of the electromagnet is energized.

The electromagnet shown in Fig. 9 is of the same type as that employed in the electromagnetic valve 16, the rocker element 98 being urged by a spring 100 to shift the brake element 97 out of contact with the disk 89 when the magnet is deenergized. In this instance the core 101 of the electromagnet constitutes a support for the stem 91 to which it is rigidly secured. One end 102 of the coil 99 is connected to the contact member 81, as indicated in Fig. 11, and the other end 103 is connected through a suitable binding post (not shown) to that portion 104 of the electrical control circuit which also includes the pilot controlled switch 45 and the electromagnetic valve 16.

The control circuit is energized from any appropriate power source, such as a commercial power circuit to which it is connected preferably through a step-down transformer 105.

The contact member 69 of the controller 48 is dead, so that when the fingers 75 and 78 of the switch members 76 and 79 have been shifted into contact therewith, the control circuit is broken, the valve 16 is closed, and the heater 15 is inactive. That condition is attained when the arm 84 and pointer 86 have been shifted to the "0" position on the scale 87 and when the knob 92 and pointer 93 has assumed the "0" position on the scale 94.

When it is desired to maintain a certain amount of hot water in the tank 10, the switch member 79 is rotated, by manipulation of the arm 84, so as to cause the finger 78 to register with one of the four contact members 70, 71, 72, or 73, in which position the pointer 86 is opposite one of the numerals "5", "10", "15", or "30" on the scale 87. If, for instance, the switch member 79 be thus set in the position shown, that side of the control circuit, including the connections 32 and 104, is connected to the switch member 56 of the thermostat through the coil 99, contact member 81, arcuate portion 79' of switch 79, finger 78, contact member 71, and lead 65, so that the electromagnetic valve 16, which controls the heater, is then controlled by the switch member 56 of the thermostat.

In the particular illustration, switch member 56 is in contact with its coacting screw 60, so the circuit is closed, the valve 16 is open, and the heater 15 is supplying hot water to the tank 10. This condition continues until the water temperature reaches a point such that the member 56 withdraws from contact with its screw 60, thereby breaking the circuit, closing the valve 16, and thus cutting off the supply of gas to the heater.

Thereafter, if, due to withdrawals or otherwise, the temperature of the water falls to a point where the member 56 again contacts its screw 60, the circuit is thus again closed, the valve 16 is again opened to admit gas to the heater, and the heater is automatically ignited by the pilot burner 35 and again supplies hot water to the tank 10.

It will thus be understood that with the switch member 79 set in the position shown, the heater 15 is controlled by the member 56 and functions automatically to maintain a supply of hot water at a temperature predetermined by the position of the coacting screw 60. It will also be understood that by adjusting the member 79, so that its finger 78 registers with one of the other contact members 70, 72 or 73, the heater may be placed under the control of one of the other members 55, 57 or 58 so as to automatically maintain the water supply at a higher or lower predetermined temperature.

The hot water supplied from the heater of course accumulates in the top of the tank, and it has been found that the temperature of the water, at the point of application of the thermostat 50 to the tank, corresponds substantially to the amount of hot water in the tank. That is to say, the greater the amount of hot water in the tank the higher the temperature and vice versa.

In this particular instance, the several screws 60 are set so that their coacting members 55, 56, 57 and 58 will break contact therewith at temperatures which correspond respectively with 5 gallons, 10 gallons, 15 gallons, or 30 gallons of hot water in the tank, so that by setting the arm 84 and pointer 86 of the controller 49 at any selected position on the scale 87 a corresponding amount of water will be automatically maintained in the tank. For example, in the position shown, the system will automatically maintain 10 gallons of hot water in the tank, and if it is desired to maintain a greater or less amount, the arm 84 and pointer 86 are shifted to the right or left from the position shown.

A temporary increase in the amount of hot water in the tank may be obtained by turning the knob 92 to effect clockwise adjustment (Figs. 8 and 10) of the switch member 76. For instance, if the switch member 79 be in the position shown, so as to normally maintain 10 gallons of hot water in the tank and occasion should arise demanding a temporary increase to 30 gallons, the knob 92 is turned clockwise until the pointer 93 is opposite the numeral "30" on the scale 94, so as to shift the finger 75 into contact with the contact member 73. Such adjustment closes the control circuit through the switch member 58 of the thermostat 50 so that the heater 15, under the control of member 58, continues to supply hot water to the tank until a temperature has been attained corresponding to 30 gallons of hot water, at which point the member 58 breaks contact with its screw 60, thereby breaking the control circuit and cutting off the heater.

It will be understood of course that the electromagnetic coil 99 is energized when the control circuit is energized, so that whenever the switch member 76 is manipulated in the manner above described, the brake member 97 is held by the electromagnet in contact with the disk 89 to thus retain the switch member 76 in the position to which it was manually set. However, when the circuit is later broken by the thermostat 50 the coil 99 is deenergized, the brake 97 is retracted, and the switch member 76 is returned by the spring 95 into a position where its finger 75 is again registered with the finger 78 of the switch member 79, the finger 75 being brought to rest in this latter position by engagement of the stop 96 thereon against the finger 78. Thereafter, when the increased supply of hot water has been consumed, the amount of hot water automatically maintained in the tank is again determined by the position of the switch member 79.

Various changes may be made in the embodiment of the invention hereinabove specifically described without departing from or sacrificing the advantages of the invention as defined in the appended claims.

I claim:—

1. In a hot water supply system the combination of a water storage tank, a gas burning water heater therefor, and means controlled by the temperature of the water in the supply of gas to said system for controlling said heater to thereby normally maintain the water in said tank at a predetermined temperature, an element adjustable to regulate the temperature thus maintained, and a second element independently adjustable to temporarily increase the temperature of the water in said tank.

2. In a hot water supply system the combination of a storage tank, a water heater connected to deliver hot water to said tank, control means for said heater automatically operable to normally maintain a predetermined amount of hot water in said tank, means adjustable to regulate the amount of hot water thus maintained, and additional means adjustable to provide a temporary increase in the amount of hot water thus maintained.

3. In a hot water supply system the combination of a water storage tank, a water heater therefor, control means for said heater automatically operable to normally maintain the water in said tank at a predetermined temperature, an element adjustable to effect a predetermined temperature increase, means effective to retain said element in adjusted position until the predetermined increased temperature is attained, and means for automatically returning said element to an initial position when said increased temperature is attained.

4. In a hot water supply system the combination of a water storage tank, a water heater therefor, control means for said heater automatically operable to normally maintain the water in said tank at a predetermined temperture, said means including an element adjustable to regulate the temperature thus maintained, a second element adjustable independently of said first element to effect a predetermined increase in the temperature normally maintained, and means for retaining said second element in adjusted position until the increased temperature has been attained and for thereafter automatically returning the same to an initial position.

5. In a hot water supply system the combination of a water storage tank, a water heater therefor, an electrical system for controlling said heater to normally maintain the water in said tank at a predetermined temperature, an element adjustable to effect a predetermined increase in the temperature normally maintained, electromagnetic means controlled by said system for releasably retaining said element in any position into which it has been adjusted until the increased temperature has been attained, and means for thereafter automatically returning said element to an initial position when said increased temperature has been attained.

LYLE BEEMAN.